United States Patent [19]
Bayer et al.

[11] Patent Number: 5,161,647
[45] Date of Patent: Nov. 10, 1992

[54] SPRING STRUT WITH A RELATIVE MOTION INDICATIVE SIGNAL

[75] Inventors: Stefan Bayer, Ditzingen-Hirschlanden; Andreas Berner, Plochingen; Wolfgang Schramm, Leonberg-Warmbronn; Eberhardt Schunck, Landau, all of Fed. Rep. of Germany

[73] Assignee: Robert Bosch GmbH, Stuttgart, Fed. Rep. of Germany

[21] Appl. No.: 681,279

[22] Filed: Apr. 8, 1991

[30] Foreign Application Priority Data

Jun. 19, 1990 [DE] Fed. Rep. of Germany ....... 4019463

[51] Int. Cl.$^5$ .............................................. F16D 66/00
[52] U.S. Cl. ................................. 188/1.11; 200/82 R
[58] Field of Search ............. 188/271, 299, 319, 1.11; 267/205; 200/61.44, 82 R, 82 D, 61.62, 52 R; 280/707

[56] References Cited

U.S. PATENT DOCUMENTS

| | | | |
|---|---|---|---|
| 3,659,268 | 4/1972 | Crawford | 200/61.45 |
| 3,793,498 | 2/1974 | Matsui et al. | 200/82 R |
| 4,726,453 | 2/1988 | Obstfelder et al. | |
| 5,007,659 | 4/1991 | Gay | 280/707 |

*Primary Examiner*—Robert J. Oberleitner
*Assistant Examiner*—Lee W. Young
*Attorney, Agent, or Firm*—Edwin E. Greigg; Ronald E. Greigg

[57] ABSTRACT

A spring strut including a work cylinder with a slider in the work cylinder. Electrical contacts are applied on the slider and cylinder and in an inward stroke, a first electrical loop, which extends via the slider, is electrically closed and a second electric loop is broken. In an outward stroke, the second electric loop is closed via the slider, and the first loop is opened. Thus, with the aid of an electrical circuit, it is simple and easy to recognize whether the work cylinder is operating in an inward or in an outward stroke.

23 Claims, 3 Drawing Sheets

SPRING STRUT WITH A RELATIVE MOTION INDICATIVE SIGNAL

BACKGROUND OF THE INVENTION

The invention is relates to a spring strut with a work cylinder for supporting a vehicle chassis, as defined hereinafter. A work cylinder is already known in which to distinguish between an inward stroke and an outward stroke, a measuring system with two Hall generators or two Hall sensors is provided. In this work cylinder, the two Hall generators or sensors are disposed 90° apart from one another.

The work cylinder includes a piston rod and a cylindrical tube, and there is a measuring segment on the cylindrical tube. The Hall sensors are disposed on the piston rod, and the measuring segment takes the form of a trapezoidal thread. By moving the sensors along the measuring segment, one signal per sensor is obtained, from which an electronic system can ascertain the direction of the relative motion.

The electronic system, the two sensors and the trapezoidal measuring segment entail a relatively major engineering effort and make themselves available as a high production cost. The electronics are not exactly simple, and so a low failure rate cannot actually be expected.

OBJECT AND SUMMARY OF THE INVENTION

The spring strut has an advantage over the prior art that the relative motion of the cylinder first group and piston and piston rod second group that can be displaced counter to one another can be ascertained with a very simple, reliable electrical circuitry.

If the slider includes a slide body and a tensioning body, and the tensioning body pre-stresses the sliding body toward the cylinder group on which the slider is supported in a frictionally displaceable manner, then friction that is largely independent of temperature and wear is advantageously attained between the slider and the cylinder group.

If the tensioning body is a snap ring, this has the advantage that a simple standardized part that is available anywhere can be used as the tensioning body.

If communication between chambers is varied via a distance by which the slider and one of the stop points of the slider are spaced apart, then the pressures in these chambers, or a flow between them, can also be varied.

The invention will be better understood and further objects and advantages thereof will become more apparent from the ensuing detailed description of preferred embodiments taken in conjunction with the drawings.

BRIEF DESCRIPTION OF THE DRAWINGS

FIGS. 1 and 3 each snow one exemplary embodiment, while

DESCRIPTION OF THE PREFERRED EMBODIMENTS

For supporting its chassis, a motor vehicle typically has spring struts, located between the vehicle chassis and its axles or wheel supports. A vehicle spring strut often includes a work cylinder. The work cylinder may be a lifting cylinder, a shock absorber or a combination of a lifting cylinder and shock absorber, for example. In addition to this work cylinder, the spring strut may for instance include other spring elements as well.

Figure 1:
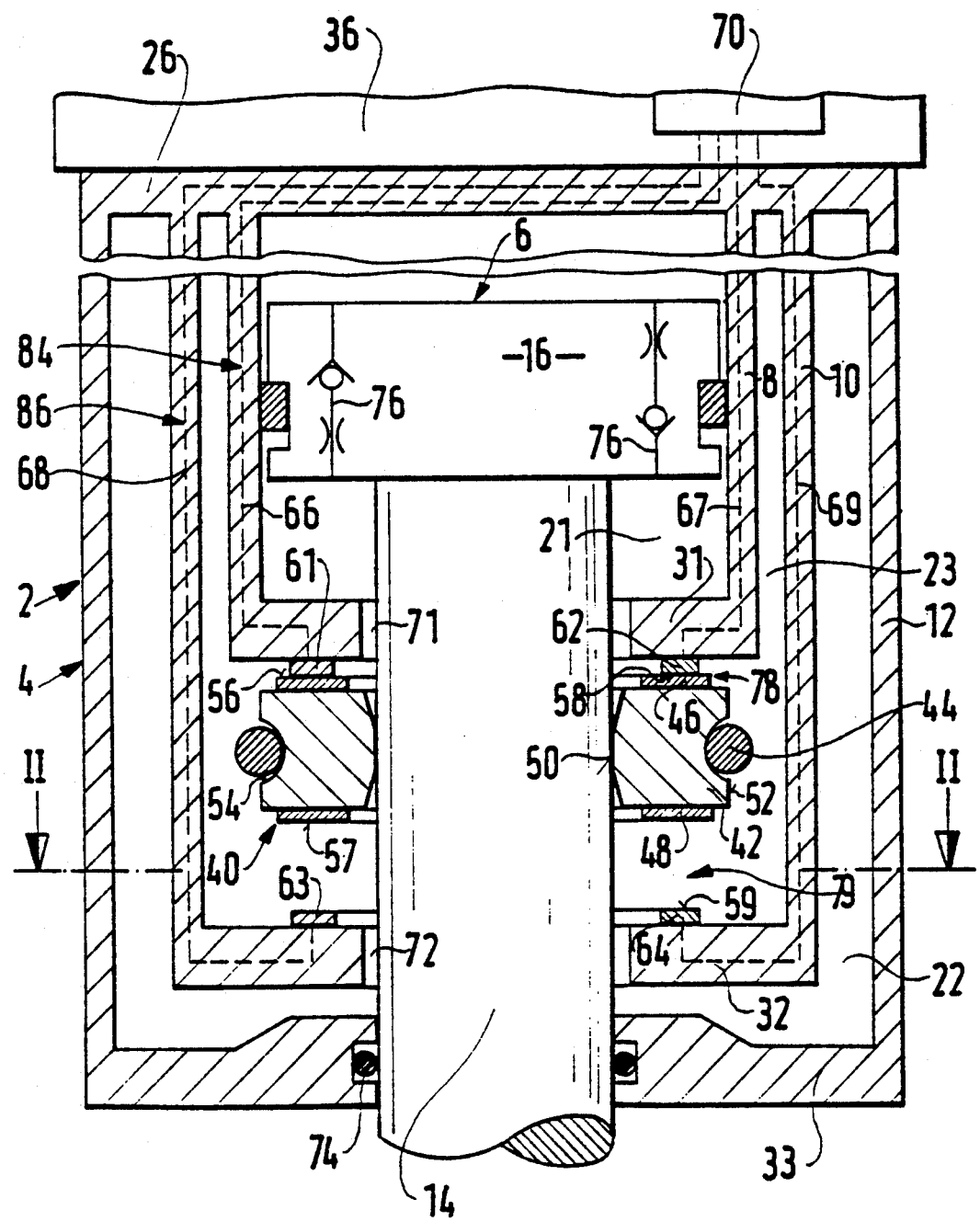

FIG. 1 shows a work cylinder 2 of a spring strut. For the sake of simplicity, the work cylinder 2 can be divided into a cylinder first group 4 and a piston and piston rod second group or second cylinder group 6. In the exemplary embodiment shown, the first cylinder group substantially includes an inner cylindrical tube 8, a middle cylindrical tube 10 and an outer cylindrical tube 12. The second cylinder group 6 substantially includes a piston rod 14 and a piston 16.

A first pressure chamber 21 is formed inside the inner cylindrical tube 8. A second pressure chamber 22 is formed between the middle cylindrical tube 10 and the outer cylindrical tube 12. A third pressure chamber 23 is formed between the inner cylindrical tube 8 and the middle cylindrical tube 10. The three pressure chambers 21, 22, 23 are axially closed off on one end by a common upper face end 26. Axially toward the other end, a first face end 31 divides the first pressure chamber 21 from the third pressure chamber 23; a second face end 32 divides the second pressure chamber 22 from the third pressure chamber 23; and a third face end 33 closes off the second pressure chamber 22 from the outside.

The piston 16 is axially displaceably supported inside the first pressure chamber 21. The piston rod 14 is connected to the piston 16. The piston rod 14 extends out of the first pressure chamber 21 through the first face end 31, through the third pressure chamber 23, through the second face end 32, through the second pressure chamber 22 and through the third face end 33 to outside the first cylinder group 4. On its end extending out of the first cylinder group 4, the piston rod 14 is connected to a vehicle axle or a wheel support, not shown. The upper face end 26 of the first cylinder group 4 is coupled to a vehicle chassis 36. A slider 40 is axially displaceable supported on the piston rod 14 and thus on the second cylinder group 6.

In the exemplary embodiment of the invention shown, the slider 40 includes a sliding body 42, a tensioning body 44, a first electric conductor 46 and a second electric conductor 48.

The sliding body 42 annularly surrounds the piston rod 14. The sliding body 42 has a slide face 50 and a jacket face 52. The slide face 50 of the sliding body 42 rests on the cylindrical outer jacket of the piston rod 14. The tensioning body 44 is disposed on the jacket face 52 of the sliding body 42. The tensioning body 44 presses radially on the sliding body 42 and thus assures pressure between the sliding body 42 and the piston rod 14, or in other words the tensioning body 44 reinforces a pressure between the sliding body 42 and the piston rod 14. To prevent the tensioning body 44 from being able to slip off the jacket face 52 of the sliding body 42, the jacket face 52 is provided with an encompassing plunge-cut groove 54, in which the tensioning body 44 is placed. In the axial direction, the slider 40 is closed off on one end by a first face end 56 and on the other by a second face end 57. A first stop 58 for the slider 40 is provided on the first face end 31 of the inner cylindrical tube 8, and a second stop point 59 for the slider 40 is provided on the second face end 32 of the middle cylindrical tube 10.

The first stop point 58 is composed substantially of a first electrical contact 61 and a second electrical contact 62. The second stop point 59 includes a third electrical contact 63 and a fourth electrical contact 64. These four contacts are all connected to an electric circuit 70: the first electric contact 61 via a first electric line 66; the second electric contact 62 via a second electric line 67; the third electric contact 63 via a third electric line 68; and the fourth electric contact 64 via a fourth electric line 69. The lines 66, 67, 68, 69 are shown in dashed lines in the drawing.

A play between the first face end 31 and the piston rod 14 forms a first opening 71, through which a first connection between the first pressure chamber 21 and the third pressure chamber 23 can extend. A play between the second face end 32 and the piston rod 14 represents a second opening 72, through which a second connection between the second pressure chamber 22 and the third pressure chamber 23 can extend. Between the third face end 33 and the piston rod 14, a sealing ring 74 is placed in a groove. The sealing ring 74 assures that the second pressure chamber 22 is sealed off from the outside.

Depending on the type of work cylinder 2, one or more hydraulic connections 76 may pass through the piston 16. The hydraulic connection 76 includes a throttle restriction and/or a one-way check valve, for example.

The slider 40 is located between the first stop point 58 and the second stop point 59. In the axial direction, the slider 40 is shorter than a distance by which the two stop points 58, 59 are space apart, so that the slider 40 can either rest with its first face end 56 on the first stop point 58, or with its second face end 57 on the second stop point 59, or it might not touch either one of the two stop points 58, 59.

There is a more or less large first distance 78 between the first face end 56 and the slider 40 and the stop point 58 of the first cylinder group 4, and there is a more or less large second distance 79 between the second face end 57 of the slider 40 and the second stop point 59 of the first cylinder group 4. In the drawing, the slider 40 is shown such that the first face end 56 is in contact with the first stop point 58, and so in the drawing the first distance 78 is zero.

The first distance 78 increases or decreases depending on the displacement of the two cylinder groups 4, 6 counter to one another. If the two cylinder groups 4, 6 are displaced counter to one another such that the first distance 78 increases, then the second distance 79 simultaneously decreases, and vice versa.

Beginning at the position of the slider 40 shown in FIG. 1, the second distance 79 between the second face end 57 and the second stop point 59 initially decreases in an outward stroke. Once the distance 79 has been overcome, the second face end 57 of the slider 40 comes to rest on the second stop point 59 of the second cylinder group 6. If the outward stroke is continued in this position of the slider 40, then the second face end 57 continues to rest on the second stop point 59, and the slider 40 slides along the piston rod 40. In an inward stroke, the first face end 56 comes to rest on the first stop point 58, after overcoming the first distance 78. If the inward stroke is continued beyond that, then the slider 40 is restrained by the first stop point 58, and the slider 40 slides along the piston rod 40. The sum of the two distances 78, 79 is less than the maximum working travel of the two cylinder groups 4, 6 relative to one another. This sum is preferably smaller by multiple times than the maximum possible working travel.

The radial pressure between the slider 40 and the piston rod 14 is suitably adjusted such that whenever the slider 40 is restrained by one of the stop points 58, 59, the displacement of the two cylinder groups 4, 6 counter to one another is not substantially hindered. However, the friction between the slide 40 and the piston rod 14 should be at least high enough that bumps and jarring, for instance, will not cause unintended displacement of the slider 40.

Figure 2:
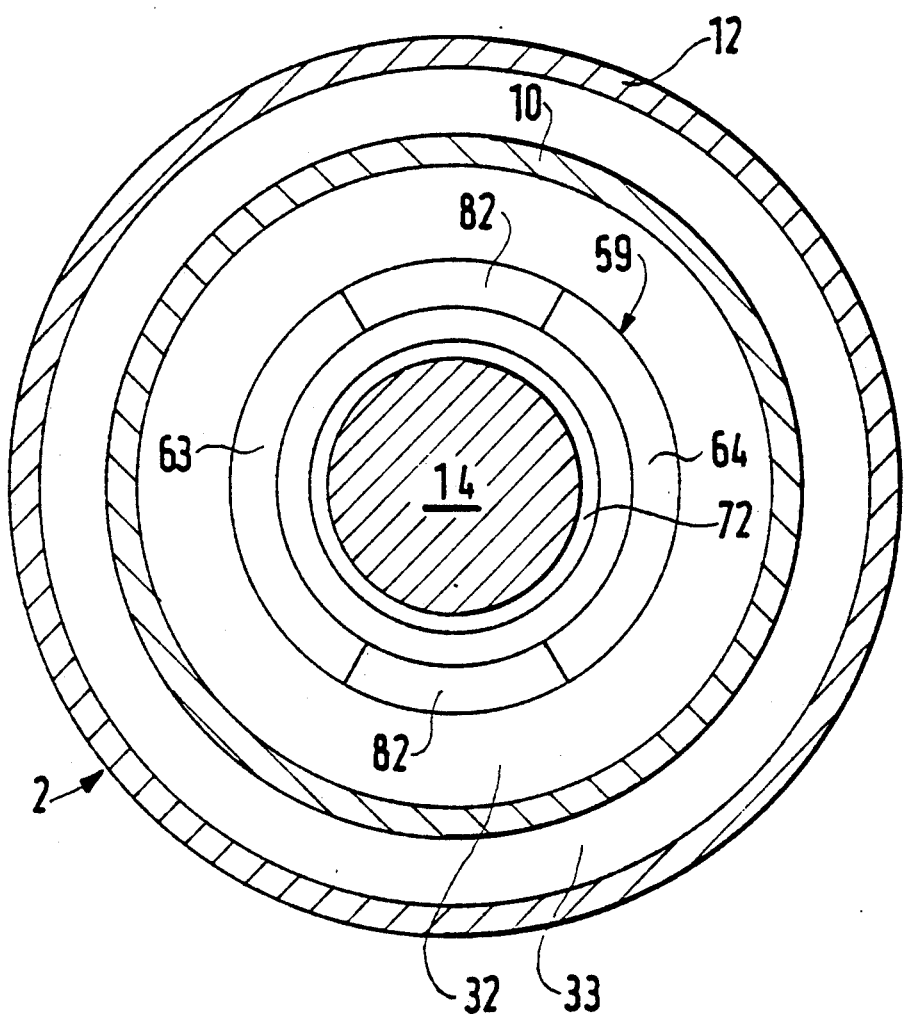
FIG. 2 is a view on a sectional plane marked II—II in FIG. 1.

The second stop point 59 annularly surrounds the piston rod 14, as is particularly clearly shown in FIG. 2. FIG. 2 is a section through the work cylinders 2 along the line II—II of FIG. 1. In all the drawing figures, elements that are the same or function the same are provided with the same reference numerals. The third electrical contact 63 and the fourth electrical contact 64, as shown in FIG. 2, extend circumferentially along the second stop point 59, but they are electrically separated from one another via spacers 82. The second face end 57 is located on the second electric conductor 48 of the slider 40. If the slider 40 is in contact with the stop point 59 with the face end 57, then a second electrical loop 86, beginning at the electrical circuit 70, is closed back to the circuit 70 through the third electric line 68, the contact 63, the electric conductor 48 of the slider 40, the contact 64, and the fourth electric line 69. If the slider 40 is not resting on the contact point 59, this second loop 86 is broken. The electrical circuit 70 can this recognize whether the slider 40 is in contact with the stop point 59, or not. The first stop point 58 with the contacts 61, 62 is embodied like the second stop point 59 that has just been described. For the first stop point 58 as well, the contacts 61, 62 are electrically insulated from one another by spacers 82. If the slider 40 is resting on the first stop point 58, then there is a first closed electrical loop 84, beginning at the circuit 70 and returning to the circuit 70, through the line 66, the first electrical contact 61, the electric conductor 46 and the electric line 67. If the slider 40 is not in contact with the first stop 58, then this first loop 84 is broken. The electric circuit 70 can thus recognize whether or not the slider 40 is in contact with the first stop point 58.

If the first electric loop 84 is closed, then the electric circuit 70 recognizes that the work cylinder 2 is in the course of an inward stroke or most recently executed an inward stroke. If the second electric loop 86 is closed, then the electric circuit 70 recognizes that the work cylinder 2 is working in the outward stroke or that its most recent stroke was outward. The distance between the two stop points 58, 59 can be selected such that the slider 40 can move over only a short distance back and forth between the two stop points 58, 59. For example, this travel distance may amount to only a few centimeters or millimeters or even fractions of millimeters; the free travel distance is preferably 0.3 mm, for example.

If the free travel distance for the slider 40 is very short, then the first loop 84 or the second loop 86 will be closed early after the beginning of an inward or outward stroke. For the sliding body 42, a material is for instance selected that in the displacement on the piston rod 14 exhibits low friction and/or low wear. This can preferably be a PTFE material. A soft material for the sliding body, which is true for instance for virtually all plastics and for nonferrous heavy metals, is favorable because in this way the piston rod 14 is not damaged. If the sliding body 42 is of an electrically conductive material, then the additional electric conductors 46, 48 can be dispensed with, and the face ends 56, 57 are formed directly on the sliding body 42. If the sliding body 42 is pressed onto the piston rod 14 in a pre-stressed manner, then in principle the tensioning body 14 can also be dispensed with. Since the material preferably used for the sliding body 42 has a different coefficient of thermal expansion than the piston rod 14, the radial pressure between the sliding body 42 and the piston rod 14 varies at different temperatures unless there is a tensioning body 44, so it is particularly advantageous to press the sliding body 42 toward the surface of the piston rod 14 with the tensioning body 44. The temperature of the sliding body 42 depends substantially on the pressure of a pressure fluid in the work cylinder 2 and, because of the heat of friction, on the speed with which the two cylinder groups 4, 6 are moved counter to one another. The tensioning body 44 is preferably a standardized snap ring, which is available virtually everywhere. Such snap rings are made of a spring steel and in the Federal Republic of Germany, for instance, are standardized under DIN standards 7993 and 9045. The tensioning bodies 44 preferably comprise a round wire and extend over an angle of between approximately 200° and almost 360° over the circumference of the jacket face 52 inside the plunge-cut groove 54. For the tensioning body 44 and for the plunge-cut groove 54, the dimensions given in DIN 7993 and DIN 9045 can be selected. With the aid of the tensioning body 44, it is possible in a particular advantageous way to assure a virtually constant pressure, which is independent of temperature and wear, between the sliding body 42 and the piston rod 14. Thus, the friction between the sliding body 42 and the second cylinder group 6 likewise advantageously remains largely constant.

The first stop point 58 extends along the contacts 61, 62 and the spacers 82 and thus forms an annular bead that extends axially. The same is true for the second stop point 59. If during an inward stroke the slider 40 rests with its first face end 56 on the first stop point 58, then the third pressure chamber 23 is disconnected from the first pressure chamber 21, but the third pressure chamber 23 communicates with the second pressure chamber 22 via the second connection embodied by the opening 72. If the slider 40 in the outward stroke has its second face end 57 contacting the second stop point 59, however, then the third pressure chamber 23 is decoupled from the second pressure chamber 22, but the third pressure chamber 23 communicates with the first pressure chamber 21 via the first connection. Thus, with the aid of the slider 40, not only can a switch state of the electric circuit 70 be controlled, but advantageously a pressure in the third pressure chamber 23, for example, can also be controlled with the aid of a slider 40. The pressure in the third pressure chamber 23 can in turn be used to control various valves, not shown in FIG. 1. For example, the pressure in the third pressure chamber 23 may be a pilot pressure for a further valve, or the direction of motion of the piston rod 14 may be ascertained with the aid of a pressure sensor, and so forth.

Figure 3:
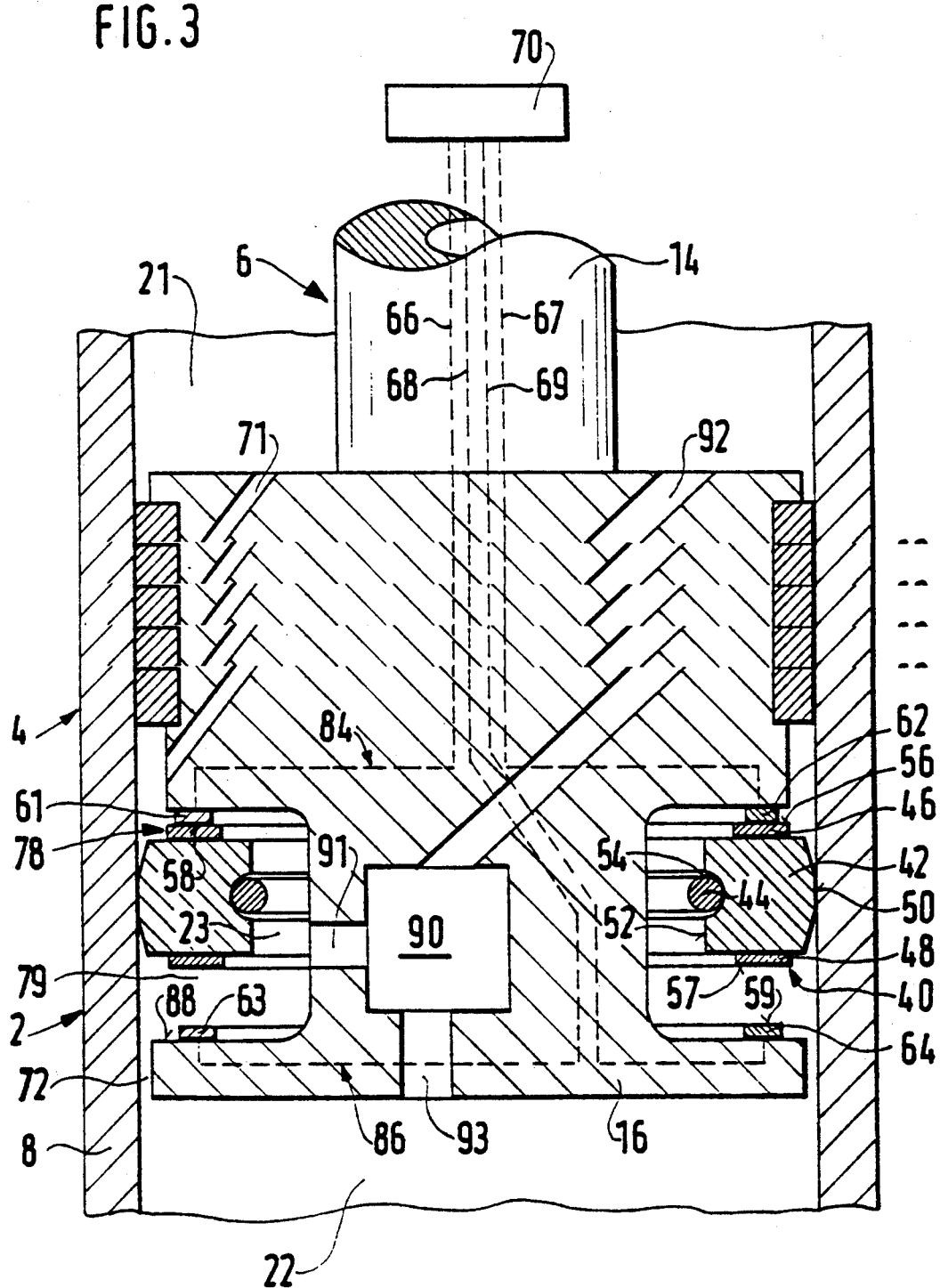

FIG. 3 shows the second exemplary embodiment. In the first exemplary embodiment of FIG. 1, the stop points 58, 59 belong to the first cylinder group 4, and the slider 40 is dragged along by the second cylinder group 6, or can slide along the second cylinder group 6. However, in the second exemplary embodiment of FIG. 3, the stop points 58, 59 are components of the piston 16 and thus belong to the second cylinder group 6, and the slider 40 is dragged along by the cylindrical tube 8 and thus by the first cylinder group 4, or the slider 40 can slide along an inner jacket of the cylindrical tube 8 and thus along the first cylinder group 4, once it has come to rest on the stop points 58, 59 of the second cylinder group 6. In the second exemplary embodiment, the tensioning body 44 tensions the sliding body 42 radially outward toward the inner cylinder jacket of the cylindrical tube 8. In both exemplary embodiments, it is possible to recognize whether the working cylinder 2 is operating in the inward stroke or the outward stroke via the contacts or via the switching state of the loops 84, 86.

In the second exemplary embodiment of FIG. 3, the first pressure chamber 21 is located above the piston 16, and the second pressure chamber 22 is located below the piston 16. In FIG. 3, the annular slider 40 is located at least partly inside a plunge cut 88 provided on the outer jacket of the piston 16. A void, which corresponds to the third pressure chamber 23, forms between the slider 40 and the piston 16. The third pressure chamber 23 communicates with a valve 90 via a first conduit 91. Via a second conduit 92, the valve 90 also communicates with the first pressure chamber 21, and via a third conduit 93 it also communicates with the second pressure chamber 22.

In an outward stroke in the second exemplary embodiment, the first pressure chamber 21 communicates with the third pressure chamber 23, via the first connection having the first opening 71 and the first distance 78. In an inward stroke, the second pressure chamber 22 communicates with the third pressure chamber 23, via the second connection having the second opening 72 and the second distance 79. The pressure in the third pressure chamber 23 can for instance be used as pilot pressure for controlling the valve 90. The valve 90 in turn controls a flow between the first pressure chamber 21 and the second pressure chamber 22, for example. If the work cylinder 2 is a shock absorber, for example, then with the aid of the pressure in the third pressure chamber the flow between the two pressure chambers 21, 22, for instance, and thus the damping force of the shock absorber can be varied as a function of whether the shock absorber at that time is operating with an inward stroke or an outward stroke.

In the exemplary embodiments described, the two electrical loops 84, 86 are provided for detecting the inward and outward strokes. In a simplified version of the spring strut according to the invention, one of the two electric loops 84 or 86 can also be dispensed with. For instance, if only the first electric loop 84 is provided, then the electrically closed loop 84 means, in the first exemplary embodiment of FIG. 1, that the work cylinder 2 is either operating in the startup stroke or that its most recent stroke was that stroke. If the first electric loop is contrarily open, this means that the work cylinder 2 is in the outward stroke or most recently has operated in that stroke. The situation is the same for the second exemplary embodiment of FIG. 1. In that case, if only the first electric loop 84 is present, for instance, then the closed electric loop 84 means that the work cylinder 2 is operating in the inward stroke or most recently executed that stroke, and if the electric loop 84 is electrically broken, that means that the work cylinder 2 is operating in the outward stroke or most recently executed an outward stroke.

Providing both loops 84, 86 in the work cylinder 2 gives an additional margin of safety. That is, if the electric circuit 70 should find that both electric loops 84, 86 are closed or have been open for a relatively long time, the probability is high that there is some defect in the system, and the circuit can issue a corresponding warning signal as indicated.

In the spring strut of the invention, if only the first connection between the first pressure chamber 21 and the third pressure chamber 23 is controlled with the aid of the slider 40, then the second opening 72 can be dispensed with. However, if only the connection between the second pressure chamber 22 and the third pressure chamber 23 is to be controlled with the aid of the slider 40, then the first opening 71 can be dispensed with. If no control of any communication between pressure chambers is to be performed with the aid of the slider 40, then both openings 71, 72 can be dispensed with, or in other words the slider 40 can operate directly inside the first or second pressure chamber 21, 22, for example.

Instead of the two electric contacts 61, 62 at the first stop point 58, a pressure probe may for instance be provided at the first stop point 58. The pressure probe or some other electric switch may for instance be disposed such that in the exemplary embodiment of FIG. 1, the slider 40 presses on this pressure probe in an outward stroke and thus selectively opens or closes the electric loop 84. The pressure probe or some other switch has the advantage that it can be sealed off and thus does not come into contact with the pressure fluid. Particularly with electrically conductive pressure fluids, is this high advantageous. A pressure probe or other switch can also be built into the second stop point 59. Alternatively, instead of the pressure probe or the switch, a proximity switch can be provided at the stop points 58, 59, which sends a signal accordingly to the electric circuit 70 upon the approach of the slider 40.

The work cylinder 2 of the spring strut embodied in accordance with the invention may for example be a shock absorber, and in particular a single- or double-tube shock absorber, or a lifting cylinder, or the like. The pressure fluid in the work cylinder 2 may be a liquid or a gas. The work cylinder 2 may for instance be a plunger cylinder, with a piston rod on which no piston is provided plunging into the interior of the work piston 2. The work cylinder 2 may instead be a so-called piston-rodless work cylinder, in which for instance the piston moves inside the cylinder but its motion is guided from the outside through a lateral slit.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A spring strut having a work cylinder, including a cylinder first group and a piston and piston rod second group displaceable counter to one another, for supporting a vehicle chassis, and having an apparatus for detecting a direction of motion for said cylinder first group relative to said piston and piston rod second group, a slider (40) is supported relative to one of said first and second groups and displaceable with friction relative thereto and said cylinder first group includes two axially spaced stop points (58, 59), wherein the slider (40) comes to rest on one of said axially spaced stop points depending on the relative direction of motion of the first and second groups after overcoming a play between the slider (40) and the applicable stop point (58, 59), the play being less than a maximum possible working travel of the first and second groups relative to one another, and wherein at least one electrical signal results from a position of the slider (40) with respect to at least one of the two stop points (58, 59).

2. A spring strut as defined by claim 1, in which an electrical signal results from the position of the slider (40) with respect to each of the stop points (58, 59).

3. A spring strut as defined by claim 2, in which at least one of the stop points (58, 59) includes two electrical contacts (61 and 61; 63 and 64) oriented toward the slider (40), and the slider (40) includes at least one electric conductor (46, 48), wherein upon contact of said at least one electrical conductor on the slider (40) with said at least one of the stop points (58, 59), said two electrical contacts are electrically connected via the at least one electric conductor (46, 48).

4. A spring strut as defined by claim 3, in which at least one of the stop points includes a switch actuatable via the slider (40).

5. A spring strut as defined by claim 3, in which the switch is a proximity switch.

6. A spring strut as defined by claim 2, in which at least one of the stop points includes a switch actuatable via the slider (40).

7. A spring strut as defined by claim 2, in which the slider (40) includes at least one sliding body (42) and a tensioning body (44) that pre-stresses the sliding body (42) toward one of said first and second groups.

8. A spring strut as defined by claim 2, in which at least one first distance (78, 79) between the slider (40) and at least one of the stop points (58, 59) affects at least one first connection between at least two pressure chambers (21 and 23; 22 and 23).

9. A spring strut as defined by claim 1, in which at least one first distance (78, 79) between the slider (40) and at least one of the stop points (58, 59) affects at least one first connection between at least two pressure chambers (21 and 23; 22 and 23).

10. A spring strut as defined by claim 9, in which the first distance (78) affects the first connection between two pressure chambers (22, 23), and a second distance (79) between the slider (40) and the other stop point (59) affects a second connection between two pressure chambers (22, 23).

11. A spring strut as defined by claim 10, in which the first connection extends between a first pressure chamber (21) and a third pressure chamber (23), and the second connection extends between a second pressure chamber (22) and the third pressure chamber (23).

12. A spring strut as defined by claim 1, in which at least one of the stop points (58, 59) includes two electrical contacts (61 and 61: 63 and 64) oriented toward the slider (40), and the slider (49) includes at least one electric conductor (46, 48), wherein upon contact of said at least one electrical conductor on the slider (40) with said at least one of the stop points (58, 59), said two electrical contacts are electrically connected via the at least one electric conductor (46, 48).

13. A spring strut as defined by claim 12, in which at least one of the stop points includes a switch actuatable via the slider (40).

14. A spring strut as defined by claim 12, in which the slider (40) includes at least one sliding body (42) and a tensioning body (44) that pre-stresses the sliding body (42) toward one of said first and second groups.

15. A spring strut as defined by claim 12, in which at least one first distance (78, 79) between the slider (40) and at least one of the stop points (58, 59) affects at least one first connection between at least two pressure chambers (21 and 23; 22 and 23).

16. A spring strut as defined by claim 1, in which at least one of the stop points includes a switch actuatable via the slider (40).

17. A spring strut as defined by claim 16, in which the slider (40) includes at least one sliding body (42) and a tensioning body (44) that pre-stresses the sliding body (42) toward one of said first and second groups.

18. A spring strut as defined by claim 16, in which at least one first distance (78, 79) between the slider (40) and at least one of the stop points (58, 59) affects at least one first connection between at least two pressure chambers (21 and 23; 22 and 23).

19. A spring strut as defined by claim 1, in which the slider (40) includes at least one sliding body (42) and a tensioning body (44) that pre-stresses the sliding body (42) toward one of said first and second groups.

20. A spring strut as defined by claim 19, in which the tensioning body (44) is a snap ring.

21. A spring strut as defined by claim 19, in which at least one first distance (78, 79) between the slider (40) and at least one of the stop points (58, 59) affects at least one first connection between at least two pressure chambers (21 and 23; 22 and 23).

22. A spring strut as set forth in claim 1 in which said slider (40) is in friction contact with said piston rod of said second group.

23. A spring strut as defined by claim 1, in which said cylinder first group includes at least one cylindrical tube (8).

* * * * *